United States Patent [19]

Breitbach

[11] Patent Number: 4,502,652
[45] Date of Patent: Mar. 5, 1985

[54] PROCESS AND APPARATUS FOR SUPPRESSING EXTERNAL LOAD CARRYING WING FLUTTER FOR AIRCRAFT

[75] Inventor: Elmar Breitbach, Göttingen, Fed. Rep. of Germany

[73] Assignee: Deutsche Forschungs- und Versuchsanstalt fur Luft-und Raumfahrt e.V., Cologne, Fed. Rep. of Germany

[21] Appl. No.: 416,174

[22] Filed: Sep. 9, 1982

[30] Foreign Application Priority Data

Sep. 12, 1981 [DE] Fed. Rep. of Germany ....... 3136320

[51] Int. Cl.³ .............................................. B64D 1/00
[52] U.S. Cl. ............................ 244/75 A; 244/137 R; 188/380; 188/267
[58] Field of Search .......... 244/75 A, 137 A; 267/22 R, 136, 182; 188/380, 267; 89/1.5 B, 1.5 G, 1.5 H

[56] References Cited

U.S. PATENT DOCUMENTS 4,314,623 2/1982 Kurokawa ............................ 188/267
4,343,447 8/1982 Reed ................................ 244/137 A
4,351,515 9/1982 Yoshida ............................. 188/267

FOREIGN PATENT DOCUMENTS 3136320 3/1983 Fed. Rep. of Germany ... 244/75 A

OTHER PUBLICATIONS

Decoupler Pylon: A Simple, Effective Wing/Store Flutter Suppressor, Wilmer H. Reed, III & Jerome T. Floughner, Jr.

Primary Examiner—Trygve M. Blix
Assistant Examiner—Rodney A. Corl
Attorney, Agent, or Firm—Thomas & Kennedy

[57] ABSTRACT

In a semi-active system for suppressing external load-carrying wing flutter in aircraft, the carrying wing (1) is provided with one or more external loads (2), and the suspension of the external load (2) on the carrying wing (1) about an axis is arranged at right angles to the plane of symmetry of the aircraft. The external load (2) is mounted to pivot about the axis (3). A spring is provided between the carrying wing (1) and the external load (2); however, it is constructed, to take up the stationary and quasi-stationary moments, as a linear spring (7) with relatively great stiffness and permitting only small spring excursions. A further spring (8) is arranged in parallel with spring (7) and is constructed to be nonlinear and also to have negative stiffness and passage through zero in the region of the negative stiffness. The springs (7 and 8) form a spring system of small stiffness in and about the operating point defined by the passage through zero of the nonlinear spring (8) and the stationary moments. The operating point of the nonlinear spring (8) is slaved in each equilibrium position between the carrying wing (1) and external load (2).

8 Claims, 9 Drawing Figures

PROCESS AND APPARATUS FOR SUPPRESSING EXTERNAL LOAD CARRYING WING FLUTTER FOR AIRCRAFT

CROSS REFERENCE TO RELATED APPLICATION

Applicant claims priority to West German Patent Application No. P 31 36 320.2-22 filed Sept. 12, 1981.

BACKGROUND OF THE INVENTION

1. Field of the Invention

The invention relates to a process for the suppression of the external load carrying wing flutter of aircraft having the carrying wing provided with one or more external loads, the external loads being mounted on the carrying wing to pivot about an axis arranged at right angles to the plane of symmetry of the aircraft and the external load being connected via a spring to the carrying wing such that in the equilibrium position between the carrying wing and external load corresponding to the respective flight condition, a lower stiffness of the spring is used such that the pitching frequency of the external load relative to the carrying wing is essentially smaller than the torsional frequency of the carrying wing without external load. The invention at the same time discloses an apparatus for suppression of the external load carrying wing flutter of aircraft with carrying wing and one or more external loads, the external load on the carrying wing being mounted to pivot about an axis arranged at a right angle to the plane of symmetry of the aircraft, and a spring being provided between the external load and the carrying wing. Each aircraft possesses one and only one symmetry plane, namely the vertical plane through the fuselage of the aircraft. A respective wing is provided to right and left of this plane and can be respectively provided with one or more external loads. Such a carrying wing with external load (or several external loads) is considered in the present application to be an important part of the vibrational system with respect to flutter.

DESCRIPTION OF THE PRIOR ART

Flutter is a dynamic instability, typical of aircraft, resulting from the cooperation of structure-dynamic and motion-induced instantaneous aerodynamic forces; the stability limit is manifested as the so-called critical flying speed (or flutter speed). Above this limit, the time-varying phase displacement generally present between the vibrational motions of the aircraft and the resulting aerodynamic forces assumes a value which leads to aerodynamic damping-out and hence to input of energy from the air flowing around into the vibrating aircraft structure. This process of excitation generally leads to the loss of the aircraft.

For this reason, considerable efforts have been exerted since the beginning of flying to overcome this dangerous phenomenon. Insuring safety from flutter is an important precondition for the success of aircraft development, now more than then. The present state of aeroelastic research offers many analytical and experimental methods both for satisfactory forecasting of the critical speeds and also for improvement of the flutter behavior. The latter can be achieved both by means of constructional or structural changes, such as, e.g., introduction of mass equalization or by change of rudder connection stiffnesses, and also by means of so-called active flutter suppression systems, which have been intensively developed during the past ten years approximately. The latter procedure uses targeted motions of control surfaces to produce additional instantaneous aerodynamic forces which lead to an increase in the critical speed. The motions of the control surfaces are forced by hydraulic devices which in turn are set in operation in a control circuit via suitable sensors by the vibrational motions of the aircraft.

This new technology hitherto aimed particularly at the suppression of wing-external load flutter suppression and thus to the elimination of flight region restrictions such as were almost unavoidable precisely for carrying wings bearing external loads.

Besides this relatively costly methodology, in recent years a more simple process was also researched which can be used exclusively for the suppression of wing-external load flutter. This process is known as "Decoupler Pylon" in the literature (W. H. Reed III, J. T. Foughner, H. L. Runyan, Jr., Decoupler Pylon, A Simple, Effective, Wing/Store Flutter Suppressor. Paper presented to the 20th Structures, Structural Dynamics, and Materials Conference, St. Louis, Mo., Apr. 4–6, 1979).

The fundamental idea of the "Decoupler Pylon" is based on the experience that wing external load flutter cases essentially arise by the interaction of two forms of wing proper vibration, one of which is predominantly characterized by bending of the wing an the other predominantly by wing torsion. The proper frequencies belonging to these two forms, i.e. the higher torsional frequency and the lower bending frequency run towards each other—starting from the corresponding stationary vibrational frequencies which appear without flow—as a function of the instantaneous air forces or the flying speed, before they nearly coincide at the flutter point. FIG. 1 shows these two frequencies plotted against speed. The lower lines represent the wing bending frequencies in each case; the upper lines represent the respective wing torsion frequencies. The dashed lines are for the case of an aircraft with an external load rigidly attached to the carrying wing. The torsional frequency is in general considerably reduced at higher speeds, and thus at the appearance of flutter. It is obvious that at relatively low aircraft speeds the frequency lines for torsion and bending already approach each other, so that this critical aircraft speed (flutter speed) is relatively low, and the aircraft can thus be flown only below this speed limit. The full lines correspond to the "Decoupler Pylon", i.e., to an external load pivotably suspended and guided on the carrying wing.

According to the principle of the "Decoupler Pylon", the flutter speed $V_{DP}$ can be considerably raised by considerably raising the torsional characteristic frequency as against the bending characteristic frequency, so that the typical approach of the two frequencies, mentioned above for the flutter speed, first takes place at higher flying speeds. According to the principle of the "Decoupler Pylon", this effect is achieved by the external load having a soft suspension as regards its pitching motion relative to the carrying wing, so that the external load, according to the seismic principle, does not take part in the torsional motions when the pitching frequency of the external load is essentially lower than the torsional frequency of the carrying wing.

FIG. 2 shows the prior art "Decoupler Pylon" schematically. An external load 2 is suspended on the carrying wing 1 and is pivotable about an axis 3 which is provided perpendicularly to the plane of symmetry. The system of carrying wing 1 and external load 2 can thus execute pitching motions without a strong coupling existing between the parts. Carrying wing 1 and external load 2 are connected together by spring 4, which is schematically shown in FIG. 2. This spring 4 can, for example, be a mechanical spring, and above all it is constructed to be relatively weak and thus has a relatively low stiffness, so that the pitching motions of the external load 2 towards the carrying wing 1, e.g., when maneuvers are flown, is hardly hindered by the spring 4.

A hydraulic device 5 is provided in parallel with the spring 4 and engages the carrying wing 1 on one side and the external load 2 on the other side. This hydraulic device is designed and controlled such that the relative position between external load 2 and carrying wing 1 which was present before flying a maneuver is restored during or after the conclusion of the maneuver. Thus this is a device for active control of the external load position restoration. Of course, considerable forces are to be taken up, so that the hydraulic device 5 must be very expensive in its construction. Furthermore, it is disadvantageous that the reliability of such a system of a spring 4 and a parallel-connected hydraulic device is not particularly high. For example, if the hydraulic device 5 fails, the relatively soft spring 4 is not able to take up appreciable forces, so that in this case the loss of the aircraft can be expected at a corresponding speed. A damper 6 can furthermore be provided in parallel with the spring 4 and the hydraulic device 5.

The operative behavior of the "Decoupler Pylon" was up to now tested in wind tunnel trials in relatively smooth flow. Use in real flying conditions, i.e., under the action of gust and maneuver loads, requires an active control system to slave the external loads to altered flight positions of the carrying wing, so that either the aerodynamic resistance or the flutter-suppressing effectiveness of the "Decoupler Pylon" is impaired. According to the magnitude of the external loads, the adjusting forces required can be considerable. The hydraulic device 5 necessary must be correspondingly large and expensive.

SUMMARY OF THE INVENTION

Here use is made of the present invention, the object of which is to teach a process and an apparatus of the kind described at the beginning and which are suitable for suppression of external load-carrying wing flutter more effectively and with smaller total cost.

According to the invention, this is achieved in the process of the kind described at the beginning in that the stationary and quasi-stationary and also dynamic moments acting on the external load about the axis during flying motions are taken up by a spring system of two springs, one spring being made linear, relatively stiff, and permitting only small spring excursions for taking up the stationary and quasi-stationary moments (e.g. long-wave gusts, maneuvers), while the other spring is made nonlinear and also with negative stiffness and passage through zero in the region of the negative stiffness and is connected in parallel to the one spring, so that to take up the dynamic moments the low stiffness of the spring system in and about the working point defined by the passage through zero of the nonlinear spring and the stationary moments is used, and that the working point of the nonlinear spring in each equilibrium position between carrying wing and external load is followed. The present invention uses from the state of the art the concept of using a low-stiffness spring between the carrying wing and the external load to decouple the external load pitching and the wing torsion, and in fact such that the pitching frequency of the external load relative to the carrying wing is essentially smaller than the torsional frequency of the carrying wing without load. Otherwise, the present invention departs from the state of the art.

In the state of the art, an expensive hydraulic device is used in parallel with the substantially soft spring, for restoring the relative position of the wing and external load, and the following disadvantages arise in dependence on the speed at which the restoration by the hydraulic device occurs at corresponding deflections. If the hydraulic device is allowed to act very rapidly after the onset of a deflection, the system of carrying wing 1 and external load 2 is decoupled to a comparatively small extent from a vibration technology viewpoint, i.e. its behavior is similar to that of a fixed external load on the carrying wing. If, on the other hand, the hydraulic device is allowed to operate more slowly, the restoration control thus engages later after occurrence of a deflection, and considerable deflection paths are then permitted between the external load and the carrying wing and must then be restored again in total, so that the mechanical expense of the hydraulic device is further increased.

The process according to the invention is not so much directed to the restoration of the relative position according to the stationary moments between the external load and the carrying wing, as is the case in the state of the art, but the vibration-technological decoupling of the system of carrying wing and external load is more in the foreground. The concept is fundamental throughout that the external load is permitted to fly on, so to speak stationary, in a straight line, which of course does not occur in so far as the external load is pivotably suspended on the carrying wing. But the vibration-technological decoupling of the system of external load and carrying wing is carried out substantially more effectively in that the forces from the stationary and quasi-stationary moments is taken up by the linear, stiff spring, while the forces arising from the dynamic moments are taken up by the spring system of the two springs in parallel. Since this spring system operates, by the parallel connection of the two springs, with the sum of the spring characteristics, as a result of the negative stiffness and the passage through zero in the region of the negative stiffness of the linear spring, there substantially results a lower stiffness of the spring system at the operating point. This means that the dynamic forces or moments encounter a spring system with lower stiffness; this means nothing else than that the system of external load and carrying wing is effectively decoupled as regards the dynamic forces, so that hence, finally, a considerable increase in the critical flying speed can be achieved.

In the process according to the invention, a restoration of the relative position between external load and carrying wing is not actually striven for, although of course such a restoration must eventually be attained. The concept in the foreground is rather that pivoting motions, and thus motions between the external load and carrying wing, are to be permitted throughout, and on the contrary always to strive to follow the operating point of the non-linear spring in each equilibrium position between carrying wing and external load. The hydraulic device is thus aimed more at yielding than at restoration. Since only a small mass must be moved during this following, namely the mass of a part of the nonlinear spring, the cost of the following device is reduced in comparison to the state of the art to a quite considerable degree.

The operating point of the nonlinear spring is slaved in each equilibrium position corresponding to the deflection of the linear spring. During flying motions, various equilibrium positions arise, according to which either straight flight is occurring, for example, or maneuver motion.

A nonlinear spring is used within the spring system of two parallel-connected springs with a slightly smaller amount of stiffness than the positive stiffness of the linear spring. According to the values of the stiffnesses of the two springs, any desired softness of the spring system can thus be achieved at the operating point. Finally, however, it is still important that the nonlinear spring is one with negative stiffness and with passage through zero in the region of the negative stiffness. This means that the nonlinear spring—considered alone—produces a labile equilibrium at which the restoring forces required for restoration in the labile position are very small for small deflections, so that the following device can be constructed correspondingly small. The following device must thus solely be able to respond relatively rapidly in other words, the following device must be controlled more rapidly than corresponds to the carrying out of a maneuver, so that the operating point of the nonlinear spring with reference to the spring system of the two parallel-connected springs, and hence the low stiffness of the spring system, is available for the dynamic forces during the maneuver.

The apparatus for carrying out the process is characterized, according to the invention, in that the one spring is made linear, relatively stiff, and only permitting small spring excursions, and there is connected in parallel with this one spring another spring with negative stiffness and passage through zero in the region of the negative stiffness, and that a device for following the working point defined by the passage through zero of the nonlinear spring corresponding to the deflection of the linear spring. Further details and advantageous embodiments of the device are established in the claims.

The present invention can also be described as follows. The static loads (forces, moments) are taken up, according to the invention, by a stiff, linear spring. This linear spring is connected in parallel with a nonlinear spring in the form of a magnetic field with negative stiffness and passage through zero in the region of the negative stiffness. There thus results a spring system of the two springs, which has a nonlinear stiffness with low stiffness in the operating point at any given time and relatively high stiffness outside the operating point. Moreover the operating point is not fixed, i.e., the spring system has a variable stiffness which is, however, controlled in its variability by slaving, such that a low stiffness of the spring system just results and only at the operating point. This low stiffness opposes the dynamic loads (forces, moments) only slightly, as desired, so that advantageously the desired vibration-technological decoupling of the system of external load and carrying wing is achieved for dynamic loads. The displacements of the operating point as a result of maneuvering loads assume substantially comparatively smaller paths than those found in the state of the art, since the linear spring, with its considerable stiffness, is always taken into account or enters into the summed action of the spring system. The masses to be displaced, which must be manipulated by the slaving, are however of an order of magnitude smaller, since the mass of the external load no longer has to be followed, but only the mass of a part of the nonlinear spring. Thus extremely small adjusting forces arise in the nonlinear part, which simultaneously represent the total adjusting forces which have to be overcome by the hydraulic device. Since the hydraulic device can be constructed very simply and small, advantageously a weight reduction of the mechanical device simultaneously takes place. The space requirement of this device is negligible. The technical cost is very small. Reliability is substantially greater than in the state of the art. Namely, if the hydraulic device fails, the linear spring, with its comparatively great stiffness, is still operative, so that only relatively small displacements can occur, seen according to the path. States of flight with failure of the hydraulic device are hence, in contrast to the state of the art, completely controllable, even with a considerable reduction of speed below the flutter speed $V_{SP}$.

Further advantages of the invention can be summed up as follows:
1. Extremely low adjusting forces when following varying loads due to maneuvers or gusts.
2. Small mass and space requirement.
3. Low production costs.
4. Simple integration into the whole system.
5. High reliability, since no parts endangered by fatigue in the nonlinear part of the spring system.
6. Simple possibilities of obtaining redundancy in the adjusting force part of the automatic load following equipment.

BRIEF DESCRIPTION OF THE DRAWINGS

The invention is further illustrated and described with reference to the drawings, which show.

DETAILED DESCRIPTION

Figure 1:
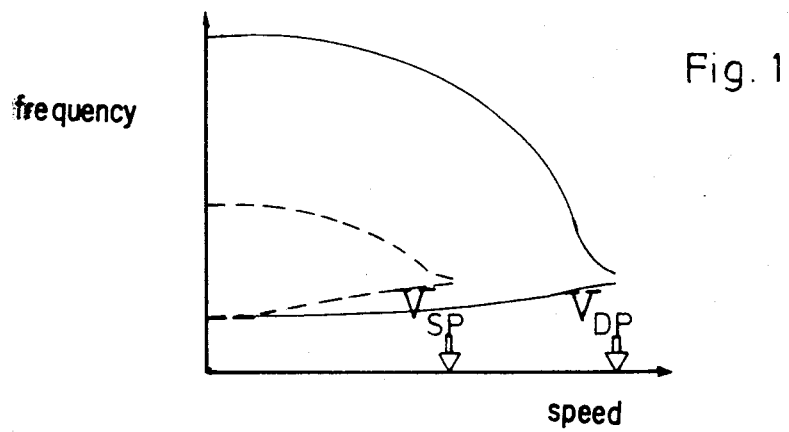
FIG. 1—a diagram of the frequencies against speed (state of the art)
Figure 2:
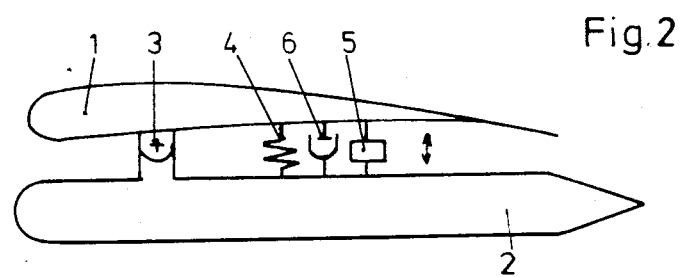
FIG. 2—the schematic structure of the "Decoupler Pylon" (state of the art)
Figure 3:
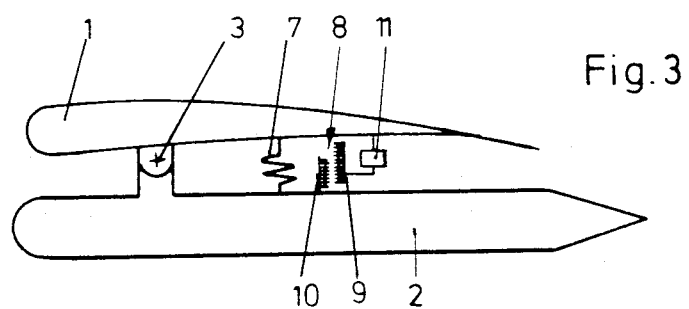
FIG. 3—the schematic construction, according to the invention, of the vibrational sytem of carrying wing and external load.

FIG. 3 shows the invention schematically. The external load 2 is also suspended here on the carrying wing 1 to pivot about the axis 3. The shaft 3 extends perpendicularly of the axis of symmetry of the aircraft. Carrying wing 1 and external load 2 are connected via a linear spring 7 with relatively great stiffness. The spring 7 can, of course, also be constructed and arranged as a rotary spring about the axis 3. Apart from this, the carrying wing 1 and the external load 2 are connected together by means of a further spring 8. The springs 7 and 8 are arranged mutually in parallel and together form a spring system 7, 8. The spring 8 consists of the two parts 9 and 10, the part 9 being on the carrying wing 1 and the part 10 being provided on, or connected to, the external load 2. Thus there exists a contactless connection between the carrying wing 1 and the external load 2 via the nonlienar spring 8. The spring 7 can, for example, be a mechanical or pneumatic spring, or can consist of several such springs. The other spring 8 can be a magnetic spring, i.e., it can be composed of various magnetic arrangements, as will be described below. It is essential that the spring 8 have a negative stiffness and a passage through zero in the region of the negative stiffness. A device 11 is provided to follow the spring 8 within the spring system 7; it is, for example, arranged on the carrying wing 1 and is thus connected to the part 9. The device 11 is supported on the carrying wing 1 and displaces the part 9 of the spring 8 relative to the part 10 of the spring 8. Of course, the device 11 could also be provided on the external load 2 or be connected to it. It is important to recognize that the device 11 is not supported between the carrying wing 1 and the external load 2, like the hydraulic device 5 of the state of the art (FIG. 2), so that the device 11 is basically not comparable to the device 5, although both devices can consist, for example, of a hydraulic adjustment device, but have considerable differences in cost, construction, and mode of operation.

Figure 4:
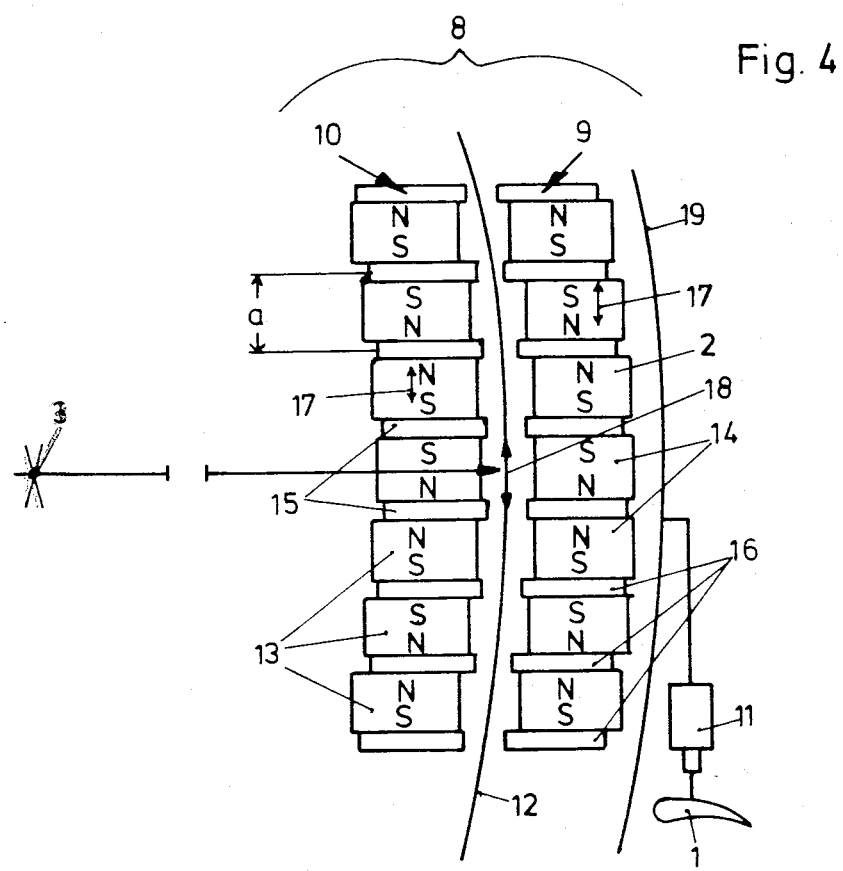
FIG. 4—an illustration of a constructional embodiment and arrangement of the nonlinear magnetic spring.

FIG. 4 shows a possible embodiment of the further spring 8 as a magnetic spring. The gap between the parts 9 and 10 is indicated by a line 12. The part 9 is to be attached to the external load 2, so that this can pivot about the axis 3, while the part 10 is connected to the carrying wing 1. The reverse arrangement is of course possible. The two parts 9 and 10 of the spring 8 consist of many adjacently arranged bar magnets 13 and 14 which are respectively separated from each other by soft iron intermediate pieces 15 and 16. The bar magnets 13 and 14 can be constructed as permanent magnets, the magnetization axes 17 of the bar magnets being arranged parallel to the direction of motion according to arrow 18. The north and south poles of the bar magnets 13, 14 are arranged such that each two adjacent bar magnets 13 or 14 each adjoint a part of the spring 8, e.g., the part 9, mutually facing the soft iron intermediate pieces 15 or 16. The magnetic lines of the bar magnets 13 or 14 are gathered together in the soft iron intermediate pieces 15 and 16 so that a U-shaped arrangement of the magnetic lines results here. As far as the arrangement of FIG. 4 is as in FIG. 3, the part 9 of the spring 8 is mounted, for example, on a frame 19 which can be displaced relative to the carrying wing 1 by means of the device 11. The device 11 can be constructed as a small stepping motor or as a small hydraulic unit. The device 11 no longer has to displace or follow the mass of the external load 2, but only the mass of the part 9 of the spring 8.

Figure 5:
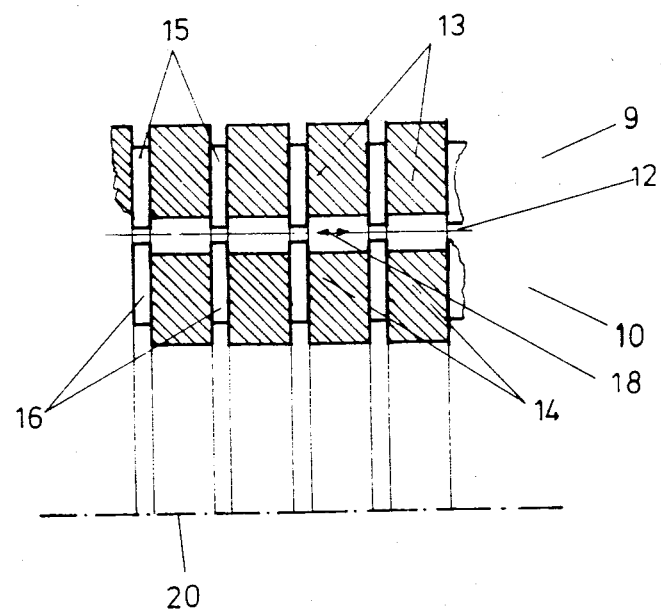
FIG. 5—another possibility of embodiment of the magnetic spring.
Figure 6:
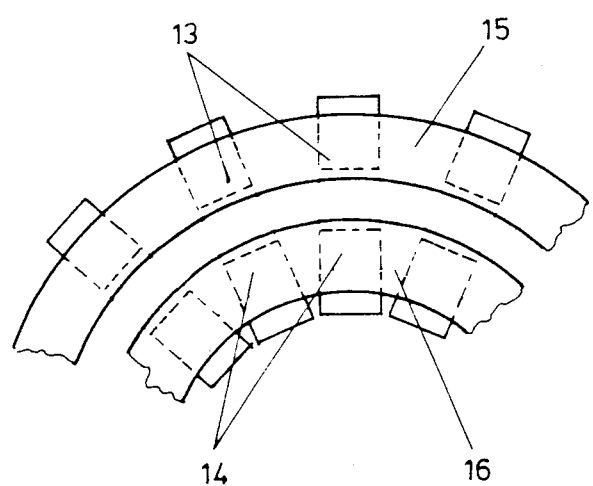
FIG. 6—a plan view of the nonlinear magnetic spring according to FIG. 5.

FIG. 5 shows a further possibility of embodiment of the nonlinear spring 8, which is constructed as a magnetic spring here also. The soft iron intermediate pieces 15 and 16 are here constructed as rings which are arranged concentrically of the common axis of symmetry 20. FIG. 6 shows a plan view of such an arrangement and also makes evident that the annular arrangement of the magnets can be realized, for example, by individual bar magnets 13 and 14 adhered to the soft iron disks 15 or 16. Such bar magnets have been made possible in particular in recent years, since great progress has been made in the development of stronger permanent magnets. This particularly leads to further savings in weight and space requirements. The arrow 18 indicates the direction of motion, in this case also, in which the relative motion takes place between the parts 9 and 10 of the spring 8. It can be seen that the direction of motion runs parallel to the axis of symmetry 20, according to the arrow 18.

Figure 7:
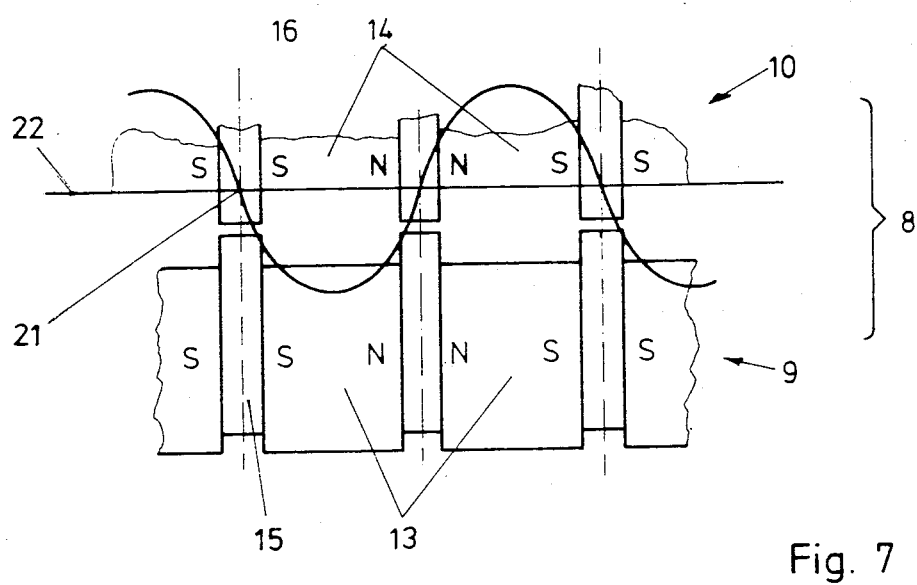
FIG. 7—the characteristic of the nonlinear magnetic spring.

FIG. 7 shows the characteristics of the magnetic spring 8 or of the two parts 9 and 10 together. The spring 8 has an operating point 21 at which the negative stiffness is present, i.e. the characteristic has a negative slope. Also, in the region of this negative slope the passage through zero is provided; thus an intersection with the zero axis results. The arrangement of the magnetic field here corresponds to the arrangement of FIG. 4. It is obvious how the two parts 9 and 10 of the spring are related to each other in a labile equilibrium. If a slight deflection takes place from this labile equilibrium position, it is to be expected, without intervention in the system, that the labile position is no longer reached.

Figure 8:
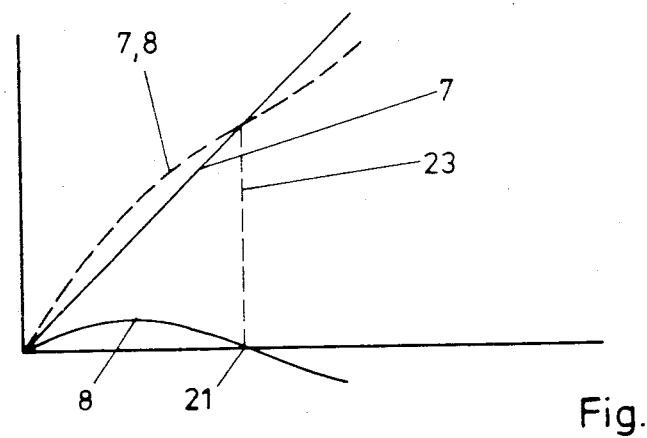
FIG. 8—a diagram of the characteristics of the two springs and of the spring system against angle of pivoting motion.

FIG. 8 shows the characteristics of the springs 7 and 8. The characteristic, and thus the stiffness of the spring 7, is positive and linear. It rises relatively steeply, so that a relatively stiff spring 7 is present. The characteristic of the spring 8 is the characteristic already described with reference to FIG. 7. By addition of the characteristics there results the dashed characteristic which results for the two springs 7 and 8. The operating point 21 of spring 8 here moves upwards on the vertical line 23. It can be seen that the resultant characteristic of the spring system 7, 8 has at the operating point a very small slope, and the spring system 7, 8 thus has relatively low stiffness, as is required for vibration-technological decoupling of the dynamic loads.

Figure 9:
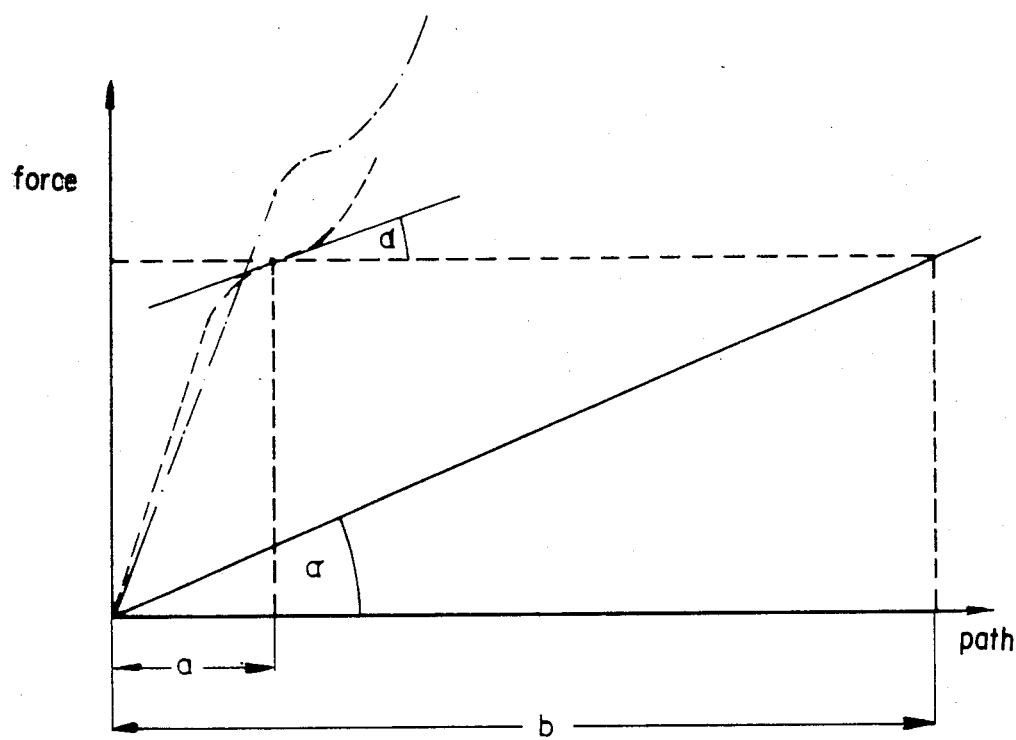
FIG. 9—a comparison of the characteristics of the nonlinear spring system with a linear spring of the same stiffness at the operating point.

FIG. 9 shows the comparison of the relatively weak spring 4 of the state of the art with the spring combination according to the invention. Here forces are plotted against paths. The full line as a straight line at the angle alpha is the spring characteristic of the spring 4 of the state of the art; a given force corresponds to the static deflection b of the linear spring 4 at the operating point, which shows a relatively large path. For comparison, with the same force, the characteristic of the spring combination 7, 8 of the object of the application is reproduced in dashed lines, and in fact for the same stiffness at the operating point (same angle alpha). The static deflection a of this nonlinear spring system 7, 8 at the operating point is substantially smaller, so that it is already evident from this that according to the invention smaller displacements between the external load 2 and carrying wing 1 occur than in the state of the art. When a deflection occurs, the operating point 21 is solely displaced in the direction of the abscissa, and thus of the path, by the required amount, so that the operating point then assumes, with a small displacement, a quite different height position already, so that loads of other magnitudes can be taken up. Only the following of a part 9 or 10 of the nonlinear spring 8 is required for displacement of the operating point. Such a displaced characteristic is shown by a dot-dash line.

| List of References | |
| --- | --- |
| 1 = carrying wing | 13 = bar magnet |
| 2 = external load | 14 = bar magnet |
| 3 = axis (shaft) | 15 = soft iron intermediate piece |
| 4 = spring | 16 = soft iron intermediate piece |
| 5 = hydraulic device | 17 = axis of magnetization |
| 6 = damper | 18 = arrow |
| 7 = spring | 19 = frame |
| 8 = further spring | 20 = axis of symmetry |
| 9 = part | 21 = operating point |
| 10 = part | 22 = zero axis |
| 11 = slaving device | 23 = line |
| 12 = line | |

I claim:

1. Apparatus for suppressing external load-carrying wing flutter of aircraft with a carrying wing (1) and at least one external load (2), comprising means connecting the external load to the carrying wing about an axis (3) arranged at a right angle with respect to the plane of symmetry of the aircraft, a system of springs (7, 8) arranged in parallel and connected between the carrying wing and the external load, said system of springs including a first spring (7) connected between the external load and the carrying wing, said first spring (7) constructed to be linear and relatively stiff to permit only small spring excursions, and a second spring (8) constructed to be non-linear with negative stiffness and passing through zero in the region of the negative stiffness, and means (11) for displacing the working point (21) defined by the passing through zero of said second spring in response to the deflection of the first spring.

2. The apparatus according to claim 1 and wherein said second spring comprises a magnetic spring including one magnetic part (9) supported by the carrying wing and another magnetic part (10) supported by the external load, and with parts (9, 10) being movable with respect to each other and mutually associated in unstable equilibrium, and said means (11) for displacing the working point comprising means to displace one of said magnetic parts with respect to the other of said magnetic parts to restore equilibrium of the magnetic spring.

3. The apparatus according to claim 2 and wherein said magnetic parts (9, 10) of said magnetic spring each comprise a plurality of bar magnets (13, 14) placed one behind the other along the direction of relative movement of the magnetic parts and each bar magnet separated from its adjacent bar magnet by intermediate soft iron elements, the bar magnets being oriented with their axes of magnetization (17) arranged in parallel to the direction of relative movement of the magnetic parts and having their poles adjoining the intermediate soft iron elements.

4. The apparatus according to claim 1 and wherein said second nonlinear spring (8) is constructed to have negative stiffness which is slightly less than the amount of the positive stiffness of said first linear spring (9).

5. The apparatus according to claim 1 and wherein said means (11) for displacing the working point (21) comprises a stepping motor connected to the carrying wing (1) and includes a magnetic element (9) connected to the carrying wing for inducing movement of another magnetic element connected to the external load.

6. The apparatus according to claim 3 and wherein said bar magnets (13, 14) and the intermediate soft iron elements are formed respectively in a thickness ratio of about 3 to 1.

7. The apparatus according to claim 2 and wherein the magnetic parts (9, 10) of said magnetic spring are each constructed with a series of bar magnets (13 or 14) and intermediate soft iron elements in a concentric annular arrangement and a concentric axis of symmetry (20) arranged in the direction of relative movement of the magnetic parts.

8. Apparatus for suspending an external load (2) from a load-carrying wing (1) of an aircraft and suppressing flutter of the wing comprising means suspending the external load from the load-carrying wing about an axis (3) perpendicular to the plane of symmetry of the aircraft, a system of springs (7, 8) on one side of said axis arranged in parallel between the load-carrying wing and its external load, said system of springs comprising a linear spring (7) having its opposite ends connected respectively to the load-carrying wing and the external load, a non-linear spring (8) having a magnetic spring with a pair of magnetic elements movable with respect to each other in response to relative movements of the load-carrying wing and the external load, one of said magnetic elements being supported by a variable position device that follows the position of the load relative to wing.

* * * * *